United States Patent [19]
Umehara et al.

[11] Patent Number: 5,091,855
[45] Date of Patent: Feb. 25, 1992

[54] OPERATION CONTROL SYSTEM FOR AUTOMATED GUIDE VEHICLES

[75] Inventors: Shigeru Umehara; Ikumitsu Kohara; Satoshi Kaseda, all of Kariya; Masao Kawase, Toyota; Yoshito Kato, Aichi; Hideki Hori; Akira Taga, both of Toyota; Shuichi Sunahara, Aichi, all of Japan

[73] Assignees: Kabushiki Kaisha Toyoda Jidoshokki Seisakusho, Kariya; Toyota Jidosha Kabushiki Kaisha, Aichi, both of Japan

[21] Appl. No.: 509,874

[22] Filed: Apr. 16, 1990

[30] Foreign Application Priority Data

| Apr. 17, 1989 | [JP] | Japan | 1-95179 |
| May 10, 1989 | [JP] | Japan | 1-118041 |
| May 18, 1989 | [JP] | Japan | 1-125677 |
| May 19, 1989 | [JP] | Japan | 1-127158 |

[51] Int. Cl.⁵ .................................... G06F 15/50
[52] U.S. Cl. ......................... 364/424.02; 180/168
[58] Field of Search ............ 364/424.02, 424.01; 318/587, 568.12, 568.17; 180/167-168

[56] References Cited

U.S. PATENT DOCUMENTS

| 4,284,160 | 8/1981 | DeLiban et al. | 180/168 |
| 4,530,056 | 7/1985 | MacKinnon et al. | 364/424.02 |
| 4,902,948 | 2/1990 | Sherman et al. | 318/580 |
| 4,935,871 | 6/1990 | Grohsmeyer | 364/424.02 |
| 4,956,777 | 9/1990 | Cearley et al. | 364/424.02 |
| 4,982,329 | 1/1991 | Tabata et al. | 364/424.02 |
| 4,994,970 | 2/1991 | Noji et al. | 364/424.02 |

Primary Examiner—Thomas G. Black
Attorney, Agent, or Firm—Brooks Haidt Haffner & Delahunty

[57] ABSTRACT

An operation control system for automated guided vehicles conveying articles along an unmanned conveying system. This operational control system comprises a first travel path loop and a second travel path loop along which a first group and a second group of the automated guided vehicles are automatically travelled. A common travel path is provided along which the automated guided vehicles of both the first and the second group are travelled, to enable a transfer of articles between the groups of automated guided vehicles. Also a correlating unit for correlating one automated guided vehicle of the first group with another automated guided vehicle of the second group, and a transfer control unit for controlling the transfer of the articles between the automated guided vehicles are provided. The transfer control unit permits only a transfer of articles between automated guided vehicles correlated with each other by the correlating unit.

14 Claims, 12 Drawing Sheets

OPERATION CONTROL SYSTEM FOR AUTOMATED GUIDE VEHICLES

BACKGROUND OF THE INVENTION

1. Field of the Invention

This invention relates to a control system for automated guided vehicles. In particular, it relates to an operation control system for a plurality of automated guided vehicles used in an unmanned conveying system.

2. Description of the Related Art

Automated guided vehicles are widely used for conveying articles in production lines, warehouses, etc. and these automated guided vehicles are equipped with driving and steering means and are able to automatically travel along a predetermined guide path.

A control system for controlling the operation of a plurality of these automated guided vehicles through guide wires installed along the travel path of the automated guide vehicles is widely used in unmanned conveying systems for production lines, such as a machine assembly line, instead of the conventional fixed type of conveying equipment such as belt or roller conveyors.

The unmanned conveying system has an advantage in that the automated guided vehicles can travel independently from one another, and is particularly suitable for application in production lines for the manufacture of many diverse items in small lots.

In an unmanned conveying system, the respective automated guided vehicles can be loaded with different kinds of work pieces, to convey them to respective areas in which the manufacturing process corresponding to the kind of workpiece is carried out. Also, the respective automated guided vehicles can be loaded with the workpieces and with the machine parts required for the assembly of those workpieces, i.e., the respective automated guided vehicles can convey all of the articles required for an assembly to the assembly area as one load.

Further, a series of manufacturing steps can be executed by transferring the workpieces between the automated guided vehicles running on the assembly lines of different manufacturing steps. Accordingly, by utilizing the advantage of an independent mobility of the automated guided vehicles, the unmanned conveying system can be effectively applied to production lines for the manufacture of many items each in small lots.

Nevertheless, in this many item, small lot type of manufacturing process, the type and kind of workpieces or machine parts carried by the respective automated guided vehicles must be correlated.

For example, if workpieces are transferred from one manufacturing line to another, the type of workpieces transferred from one automated guided vehicle must be the same as the type of machine parts or other workpieces already loaded on the automated guided vehicle to which the workpieces are transferred from the vehicle of the other manufacturing line. That is, if the types of workpieces and machine parts loaded on the vehicles of the different manufacturing lines are not correlated, the manufacture of the workpieces by transferring them from one manufacturing line to another cannot be effected.

An object of the present invention is to provide an operation control system for automated guided vehicles which can correlate the automated guided vehicles of different manufacturing lines so that workpieces can be transferred from an automated guided vehicle of one manufacturing line to another specific automated guided vehicle of another manufacturing line.

Also, when the unmanned conveying system is employed in a manufacturing line such as a machine assembly line, the automated guided vehicles must travel while maintaining a predetermined interval between the vehicles. This is particularly required when the automated guided vehicles pass through assembly stations, as the workpieces must be supplied at constant predetermined intervals in the assembly stations, in the same way as of a conventional fixed conveyor system, to facilitate the assembly work of operators at the assembly stations.

Accordingly, a further object of the present invention is to provide an operation control system for automated guided vehicles by which the vehicles can be travelled at specific parts of the travel path thereof while maintaining a predetermined distance between the vehicles.

Further, the automated guided vehicles used in the unmanned conveying system are usually equipped with battery systems as power sources for the drive motors and other control devices thereof. This means that, upon starting or terminating the functioning of the automated guided vehicles, the operators must switch on or off the power switches at each vehicle individually, and in a system which employs a number of these vehicles, this operation of the power switches is troublesome and time consuming.

Therefore, another object of the present invention is to provide an operation control system for automated guided vehicles which includes a control device by which the starting and terminating of the functioning of all of the automated guided vehicles can be carried out simultaneously by a remote control operation.

SUMMARY OF THE INVENTION

According to the present invention, there is provided an operation control system for automated guided vehicles conveying articles in an unmanned conveying system comprising: a first travel path loop along which a first group of the automated guided vehicles are automatically travelled; a second travel path loop along which a second group of the automated guided vehicles are automatically travelled; a common travel path along which both the first and the second groups of the automated guided vehicles are travelled, to transfer articles from the automated guided vehicles of one group to the automated guided vehicles of the other group; a correlation means for correlating one automated guided vehicle of the first group with another automated guided vehicle of the second group; a transfer control means for controlling a transfer of the articles carried by the automated guided vehicles on said common travel path in such a manner that said transfer is permitted only between automated guided vehicles correlated by said correlation means.

According to one aspect of the present invention, there is provided an operation control system for automated guided vehicles conveying articles in an unmanned conveying system comprising: stop means for stopping the automated guided vehicles at an entrance of a predetermined area of the travel path loops; dispatch means for restarting the automated guided vehicles stopped by the stop means; a dispatch control means for controlling the dispatch means to dispatch the automated guided vehicles in such a manner that the respective automated guided vehicles are travelled in said predetermined area while maintaining a predetermined distance from preceding automated guided vehicles.

Further, according to another aspect of the present invention, there is provided an operation control system for automated guided vehicles conveying articles in an unmanned conveying system comprising: a signal transmission means for transmitting signals to the automated guided vehicles; a power switch control means for transmitting a SWITCH ON signal and a SWITCH OFF signal to the automated guided vehicles through said signal transmission means; a signal receiving means installed in each automated guided vehicle for receiving signals from said signal transmission means; a switching means installed in each automated guided vehicle for switching OFF the power supply to travel control devices of each automated guided vehicle when the SWITCH OFF signal is received by said signal receiving means, and switching ON the power supply to said travel control devices when the SWITCH ON signal is received by said signal receiving means.

BRIEF DESCRIPTION OF THE DRAWINGS

The present invention will become more apparent from the following description of the preferred embodiment with reference to the accompanying drawings; in which:

FIG. 13 shows the relationship between FIGS. 13A and 13B;

DESCRIPTION OF THE PREFERRED EMBODIMENT

The present invention is described in detail with reference to an embodiment of an unmanned conveying system employed in a machine manufacturing factory.

Figure 1:
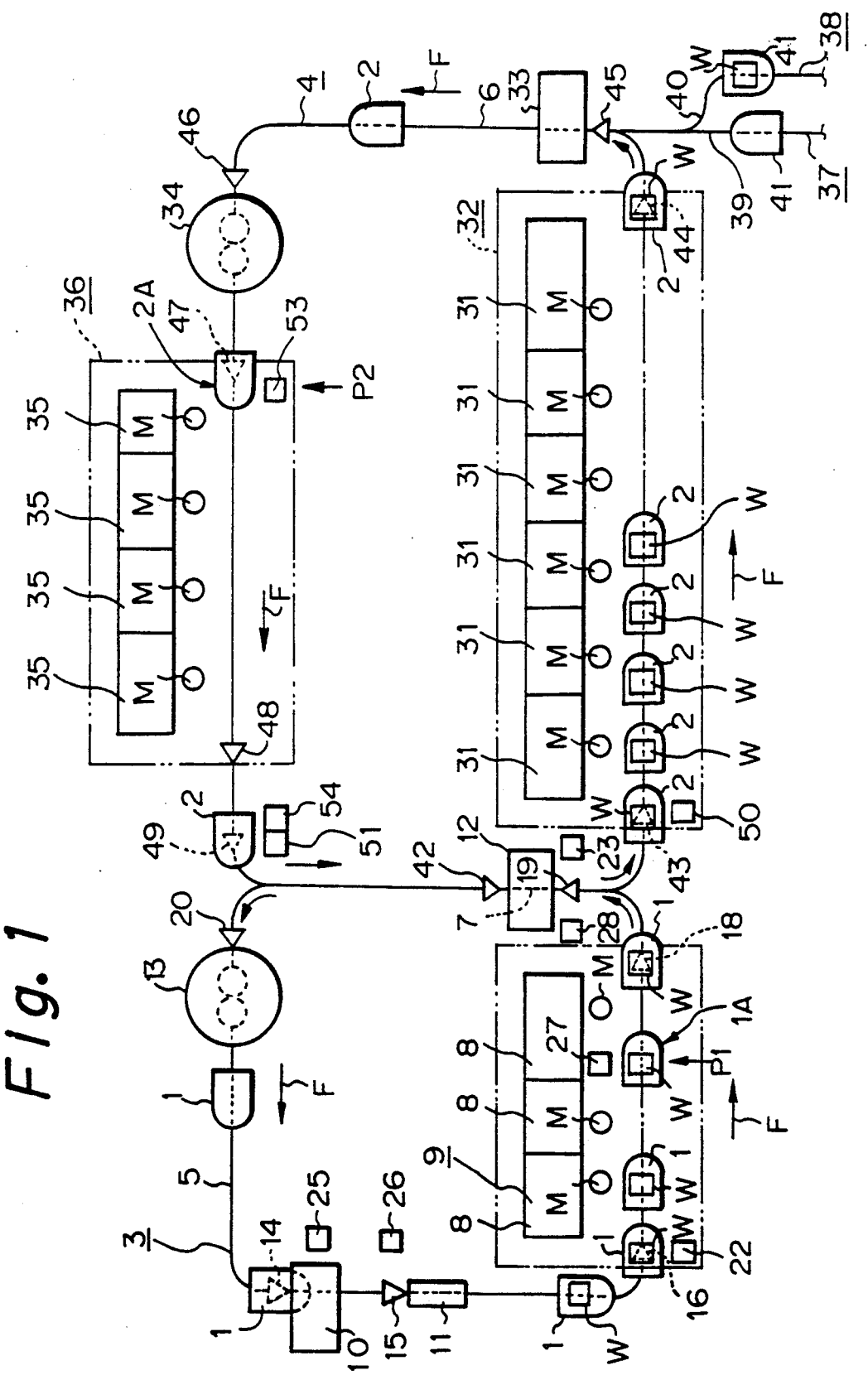
FIG. 1 is a diagrammatic plan view of an unmanned conveying system having two groups of automated guided vehicles travelling along separate travel paths incorporated therein, according to the present invention.

FIG. 1 shows an unmanned conveying system employing a plurality of automated guided vehicles. (Hereinafter called "AGV")

As shown in the Figure, the unmanned conveying system includes a first travel path 3 along which a first group of AGV 1 are travelled, and a second travel path 4 adjacent to the first path and along which a second group of AGV 2 are travelled.

The respective travel paths 3 and 4 are defined by guide wires 5 and 6, respectively, laid on the floor of the factory, and through which low frequency weak alternating currents are supplied to transmit signals to each of the AGV 1 and AGV 2.

As shown in the Figure, the travel paths 3 and 4 are formed as substantially rectangular closed loops having one common side 7. The common side 7, in which the guide wires 5 and 6 are laid in parallel and partially overlapped, forms a common travel path for the AGV 1 and AGV 2. Also, as shown in the Figure, the AGV 1 and AGV 2 travel in the direction F, i.e., counterclockwise, on the respective travel paths 3 and 4. While on the common travel path 7, the AGV 1 and AGV 2 are controlled in such a manner that the AGV 1 and the AGV 2 pass alternately along the common travel path 7, to avoid an interference by one AGV with another AGV.

In this unmanned conveying system, the respective travel paths 3 and 4 constitute successive steps of a machine manufacturing process, namely, the first travel path 3 defines a first assembly line, and the second travel path 4 defines a second assembly line. Workpieces W are conveyed along the respective travel paths 3 and 4 by the respective AGV 1 and AGV 2, and further, are transferred from the first assembly line (on the first travel path 3) to the second assembly line (on the second travel path 4) to facilitate the machine manufacturing process.

On the first travel path 3, a first assembly area 9 including a plurality of first assembly stations 8 is arranged at one side of the rectangular loop formed by the first travel path 3, and various machine parts, and an operator M for fitting these parts to the workpieces W, are located at the respective assembly stations 8. A loading station 10 is located on the first travel path 3 upstream of the assembly area 9 with regard to the travel direction F of the AGV 1, at which workpieces W are loaded onto the AGV 1 so that parts can be assembled thereto at the assembly area 9. A nut runner unit 11, which is an apparatus for loosening attaching bolts of the workpieces W to facilitate assembly work at the first assembly stations 8, is located between the loading station 10 and the assembly area 9.

Also, a transfer loading station 12 is located on the common travel path 7 downstream of the first assembling area 9, and the workpieces W after completion of the first assembly process are transferred from the AGV 1 on the first travel path 3 to the AGV 2 on the second travel path 4, at this transfer loading station 12. A first charging station 13 is located on the first travel path 3 downstream of the transfer loading station 12, and is used for charging the batteries of the AGV 1.

Figure 2:
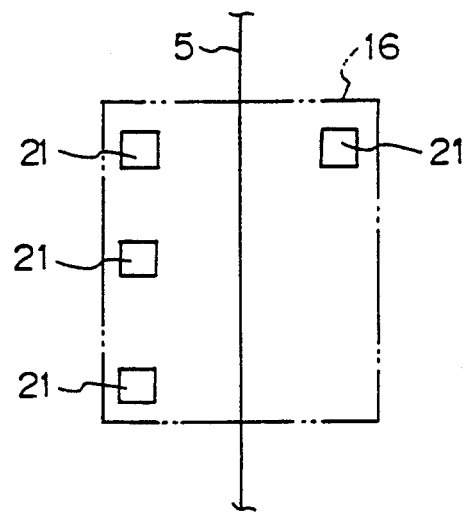
FIG. 2 is a plan view of stand-by marks arranged at the entrance to an assembly area.
Figure 3:
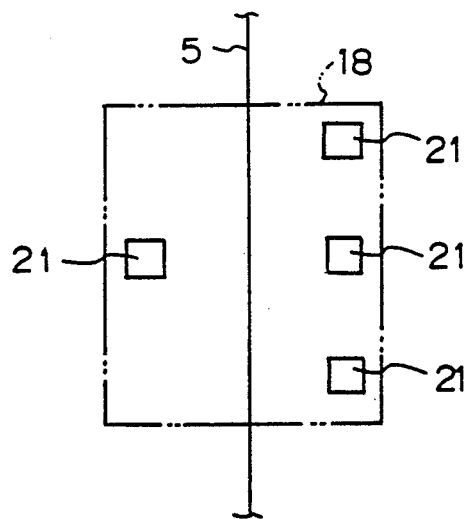
FIG. 3 is a plan view of exit marks arranged at the exit of a first assembly area.

Position indicating marks 14, 15, 16, 18, 19, 20 are arranged along the first travel path 3 to indicate that the AGV 1 has arrived at specific points along the travel path 3. Namely, "loading station mark 14" is located at the entrance to the loading station 10, to indicate that the AGV 1 has arrived at the entrance to the loading station 10; a "nut runner mark" 15 is located at the nut runner unit 11 to indicate that the AGV 1 has arrived at the location of the nut runner unit 11; a "stand-by mark 16" and an "exit mark" 18 are located at the entrance and exit, respectively, of the first assembly area 9; a "transfer station mark" 19 is located along the common travel path 7 upstream of the transfer loading station 12 with regard to the travel direction F of the AGV 1; and a "charging station mark 20" is located at the entrance of the charging station 13. The respective position indicating marks are formed by a plurality of components; for example, as shown in FIGS. 2 and 3, the stand-by mark 16 and the exit mark 18 are formed by a plurality (four in this embodiment) of steel plate pieces 21 arranged on both sides of the guide wire 5 in predetermined patterns, and similarly, other marks 14, 15, 19 and 20 are formed by a plurality (three to five in this embodiment) of steel plate pieces 21 arranged in different patterns.

As shown in FIG. 1, the first dispatcher 22 is located at the side of the travel path 3, at a point corresponding to the stand-by mark 16. This first dispatcher 22 comprises a light emitting device which emits a light signal to an AGV 1 at the stand-by mark 16 and causes the AGV 1 to travel into the first assembly area 9. The second dispatcher 23, which is similar to the first dispatcher 22, is located at the side of the common travel path 7 at a point corresponding to the transfer station mark 19 and dispatches an AGV 1 stopped at the transfer station mark 12.

The unmanned conveying system in this embodiment is designed to handle many kinds of workpieces W, and accordingly, the respective AGV 1 are equipped with means for recording and indicating the kind of workpieces W located thereon.

Figure 7:
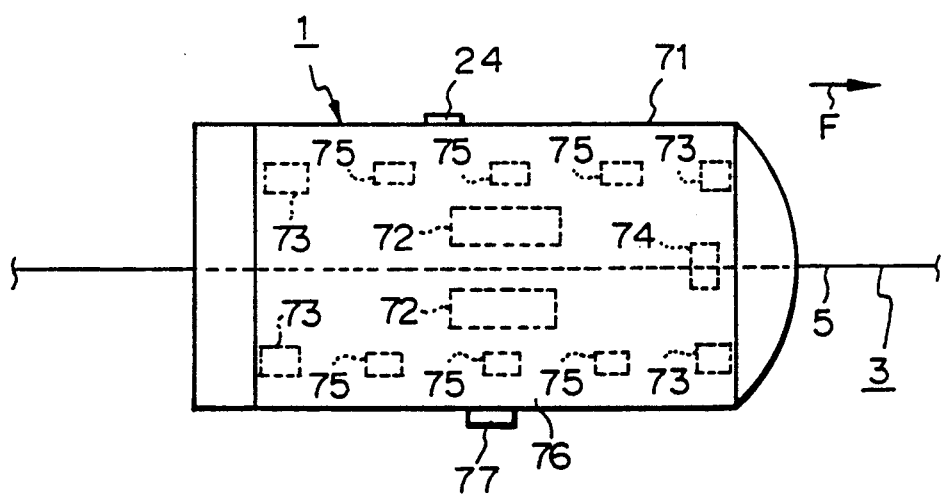
FIG. 7 is a plan view of the automated guided vehicle in FIG. 6, and shows various sensors arranged underneath the body thereof.

In this embodiment, this means comprises a recording medium such as a card type random access memory circuit (RAM card) in which information concerning the kinds of workpieces W (type code) is stored. This recording medium (hereinafter called "identification card" or "ID card") 24 is attached to the body of each respective AGV 1, as shown in FIG. 7. Also, for writing or reading the workpiece W type code to and from the ID cards 24, ID communicators are arranged along the travel path 3. Namely, the first ID communicator 25 is located at the loading station 10, to write the code of the type of workpieces W loaded at the loading station 10 into the ID card of the AGV 1; the second ID communicator 26 is located at the nut runner mark 15, to read out the workpiece W type code from the ID card 24, to facilitate operation of the nut runner unit 11 when loosening the attaching bolts of the workpieces W with a torque determined by the kind of workpieces W; the third ID communicator 27 is located at a predetermined position (a first point P1) at the first assembly area 9, i.e., upstream of the common travel path 7; and the fourth ID communicator 28 is located at the transfer station mark 19. Both the third and fourth ID communicators are used for reading out the workpiece W type code from the ID card 24.

The arrangement of the second travel path 4 is now explained.

The second travel path 4 is formed as a substantially rectangular closed loop, and a main assembly area 32, which includes a plurality of main assembly stations 31, is located at one side of the loop formed by the second travel path 4, downstream of the common path 7. Various machine parts for assembling workpieces W, and an operator M, are located at each main assembly station 31.

The workpieces W conveyed to the transfer loading station 12 by the AGV 1, along the first travel path 3, are transferred to the AGV 2 on the second travel path 4 at the transfer station 12.

Namely, an unloading station 33 at which the workpieces W after completion of the assembly thereof are unloaded from the AGV 2, is located downstream of the main assembly area 32, and a second charging station 34 is located downstream of the unloading station 33, for charging the AGV 2.

Further, a parts supply area 36, which includes a plurality of parts supply stations 35, is located along the second travel path 4, downstream of the charging station 34. Various kinds of the machine parts, and an operator M for loading required machine parts onto the AGV 2, are located at each parts supply station 35. A larger number of kinds of machine parts are held at each parts supply station 35 than is held at each main assembly station 31. At the parts supply stations 35, the operators M select and load the machine parts onto the AGV 2, according to the types of the workpieces W to be loaded onto that AGV 2 at the transfer loading station 12.

In this embodiment, other travel paths 37, 38 join the travel path 4 upstream of the unloading station 33, and are provided with guide wires 39, 40 installed on the floor. The travel paths 37, 38 lead to a test area (not shown in the Figure) at which completion tests of the assembled workpieces are carried out. Namely, the workpieces W are transferred from the AGV 2 to an AGV 41 on the travel path 37, 38 at the unloading station 33 and conveyed to the test area. The AGV 2 and the AGV 41 are controlled at the transfer loading station 12 in the same way as for the AGV 1 and AGV 2, so that they pass alternately through the unloading station 33 to avoid thereby interference therebetween. As shown in FIG. 1, position indicating marks 42-49 are arranged along the second travel path 4 in the same way as those arranged along the first travel path 3. These position indicating marks include a "transfer loading station mark" 42 located at the entrance (with regard to the travel direction F of the AGV 2) to the transfer loading station 12; a "stand-by mark" 43 located at the entrance to the main assembly area 32; an "exit mark" 44 located at the exit of the main assembly area 32; an "unloading station mark" 45 located at the entrance to the unloading station 33; a "charging station mark" 46 located at the second charging station 34, an "entrance mark" 47 located at the entrance to the parts supply area 36; an "exit mark" 48 located at the exit of the parts supply area 36; and a "stand-by mark" 49 located upstream of the common path 7. The position marks 42–49 are formed by a plurality (three to five in this embodiment) of steel plate pieces 21 arranged in respective patterns in the same way as the position indicating marks of the first travel path 3.

As shown in FIG. 1, the third and the fourth dispatchers 50, 51 respectively, are also located on the second travel path 4, these dispatchers 50, 51 are similar to the dispatchers 22, 23 of the first travel path 3, and are equipped with a light emitting device to dispatch an AGV 2 stopped at the stand-by marks 43 and 49. The third dispatcher 50 is located along the travel path 4 at a point corresponding to the stand-by mark 43, and the fourth dispatcher 51 is located upstream of the common travel path 7 at a point corresponding to the stand-by mark 49.

ID cards 52, which are similar to the ID cards 24, are attached to the bodies of the respective AGV 2, for a storage and indication of the type codes of the workpieces W.

The fifth ID card communicator 53 for writing the type codes of the workpieces W into the ID card 52 is located at a predetermined second point P2 at the entrance to the parts supply area 36, and the sixth ID communicator 54 for reading out the type codes from the ID card 52 is located at the stand-by mark 49 upstream of the common travel path 7.

In this embodiment, the ID cards 24, 52 are powered by "long-life" lithium batteries and transmit microwave signals indicating the type codes of the workpieces W stored in the ID cards during the entire operation. Also, when receiving microwave signals from the ID communicators 25–28, 53, 54, the ID cards 24, 52 store the type codes of the workpieces W indicated by those signals. Accordingly, the respective ID communicators 25–28, 53, 54 are equipped with flat antenna to transmit and receive microwave signals to and from the ID cards 24, 52, and therefore, the writing and reading of information to and from the ID cards 24, 52 can be carried out within a range of 1-3 meters from the ID communicators without the necessity of physical contact therebetween.

Figure 4:
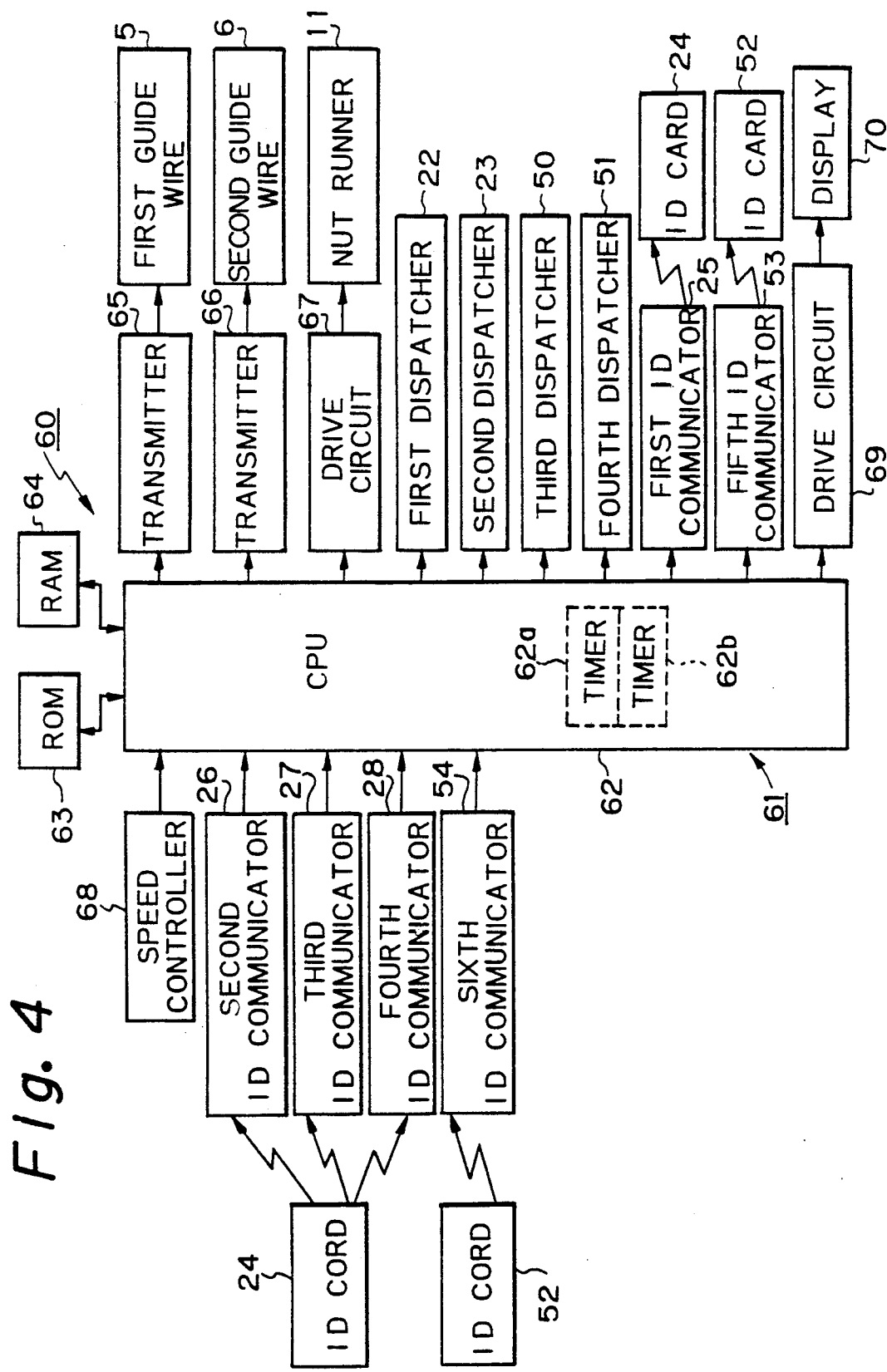
FIG. 4 is a block diagram of the operation control device for the unmanned conveying system in FIG. 1.

FIG. 4 shows the arrangement of an operation controller 60 which is a part of the operation control system and is installed in a central control panel on the floor of the factory. (not shown in the Figures).

The operation controller 60 is equipped with a microcomputer 61 which consists of a central processing unit (CPU) 62 including two timers 62a and 62b, a read only memory (ROM) 63 which stores operation control programs, and a random access memory (RAM) 64. The microcomputer 61 controls the operations of the AGV's in the unmanned conveying system.

Accordingly, the CPU 62 is connected to transmitters 65 and 66 which supply a low frequency weak alternating current through the guide wires 5 and 6, respectively, in accordance with signals output by the CPU 62. The travelling speed of each AGV 1 and AGV 2 is changed by a speed controller 68. Namely, the CPU 62 receives a speed setting signal from the speed controller 68, and accordingly, changes the frequency of the low frequency weak alternating current supplied through the guide wires 5, 6 by actuating the transmitters 65, 66 in accordance with the speed setting signal output by the speed controller 68.

Also, the CPU 62 is connected to a drive circuit 67 for the nut runner unit 11, by which the nut runner 11 is operated in accordance with control signals output by the CPU 62.

The dispatchers 22, 23, 50, 51 are also connected to the CPU 62, and emit light signals for dispatching the respective AGV's in accordance with control signals output by the CPU 62.

The timers 62a, 62b count the time elapsed from the emission of light signals by the first dispatcher 22 and the third dispatcher 50, respectively, and the CPU 62 operates the first dispatcher 22 when the time count by the timer 62a reaches a predetermined value, i.e., when a predetermined time has elapsed since a dispatch of an AGV 1, whereby a predetermined distance is maintained between the AGV's 1 in the first assembly area 9. Predetermined distances between the AGV 2 in the main assembly area 32 are maintained in the same way by the timer 62b and the third dispatcher 50.

The first to the sixth ID communicators 25–28, 53, 54 are also connected to the CPU 62. The first ID communicator 25 writes the type codes into the ID cards 24 in accordance with instructions received from the CPU 62, and the second to fourth, and the sixth ID communicators 26–28, 54 read out the type codes stored in the ID card 24, 52 and transmit these codes to the CPU 62. The CPU 62 controls the fifth ID communicator 53 to write the type codes transmitted from the third ID communicator 27 to the ID cards 52 on the AGV 2, i.e., the type code read from the ID card 24 of the AGV 1 passing the first point P1 is written to the ID card 52 of the AGV 2 passing the second point P2. This procedure enables machine parts required for the workpiece W transferred to the AGV 2 at the transfer loading station 12 to be loaded onto that AGV 2 at the parts supply stations 35.

Figure 6:
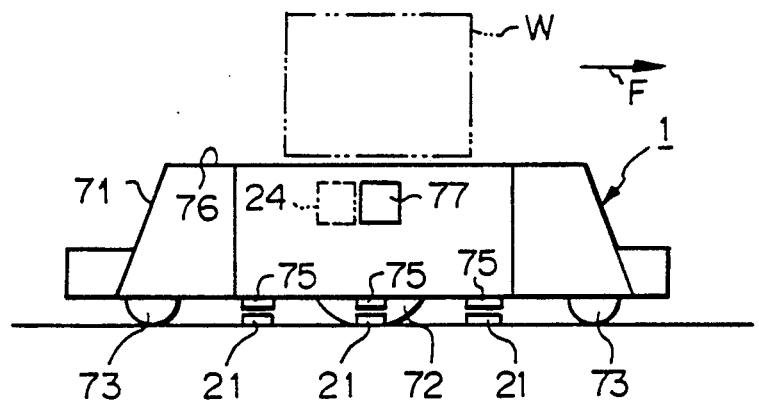
FIG. 6 is a side elevational view of the automated guided vehicle on the first travel path in the embodiment illustrated in FIG. 1.

The construction of the AGV 1 is now explained with reference to FIGS. 6 and 7.

The AGV 1 is automatically travelled along the first travel path 3, and accordingly, the AGV 1 is provided with a steering means including a means for sensing the guide wire 5 to correct a transverse deviation therefrom by the AGV 1, and a drive means for travelling the AGV 1 along the guide wire 5. As shown in FIGS. 6 and 7, the AGV 1 comprises a body 71 and left and right side drive wheels 72 at the bottom thereof. The pair of drive wheels 72 constitutes both the AGV 1 steering means and drive means. Further, four auxiliary wheels 73 are installed near each corner of and underneath the body 71. A pickup coil 74 for detecting the guide wire 5 is located at a front central portion of the bottom of the body 71. This pickup coil 74 senses the low frequency weak alternating current supplied through the guide wire 5. Further, a plurality (six in this embodiment) of proximity sensors are arranged on the bottom of the body 71, and these proximity sensors act as mark sensors 75 for detecting the position mark sensors 14–16 and 18–20. The mark sensors 75 are arranged such that the spacing between the respective mark sensors 75 is identical to the spacing of the steel plate pieces 21 of the position indicating marks 14–16, 18–20, and the mark sensors 75 detect and read the patterns of the steel plate pieces 21 of the respective position indicating marks.

The upper side of the body 71 serves as a cargo platform 76 on which the workpieces W are placed. A photo sensor 77 is installed on one side of the body 71 for receiving the light signals from the first and the second dispatchers 22, 23, and an ID card 24 is attached to the other side of the body 71.

Figure 8:
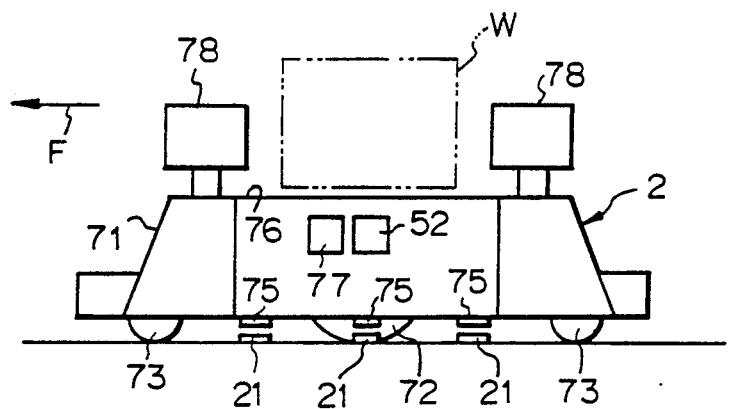
FIG. 8 is a side elevational view of the automated guided vehicle on the second travel path in FIG. 1.

FIG. 8 shows the AGV 2 on the second travel path 4. The construction of the AGV 2 is generally the same as the AGV 1, and therefore, only the differences therebetween are described below.

As shown in FIG. 8, two parts racks 78 are arranged at the front and rear of the upper side of the body 71, to which various machine parts are loaded at the parts supply area 36.

Here, the photo sensor 77 for receiving the light signals from the third and the fourth dispatchers 50, 51 and the ID card 52 are arranged on the same side of the body 71.

Figure 5:
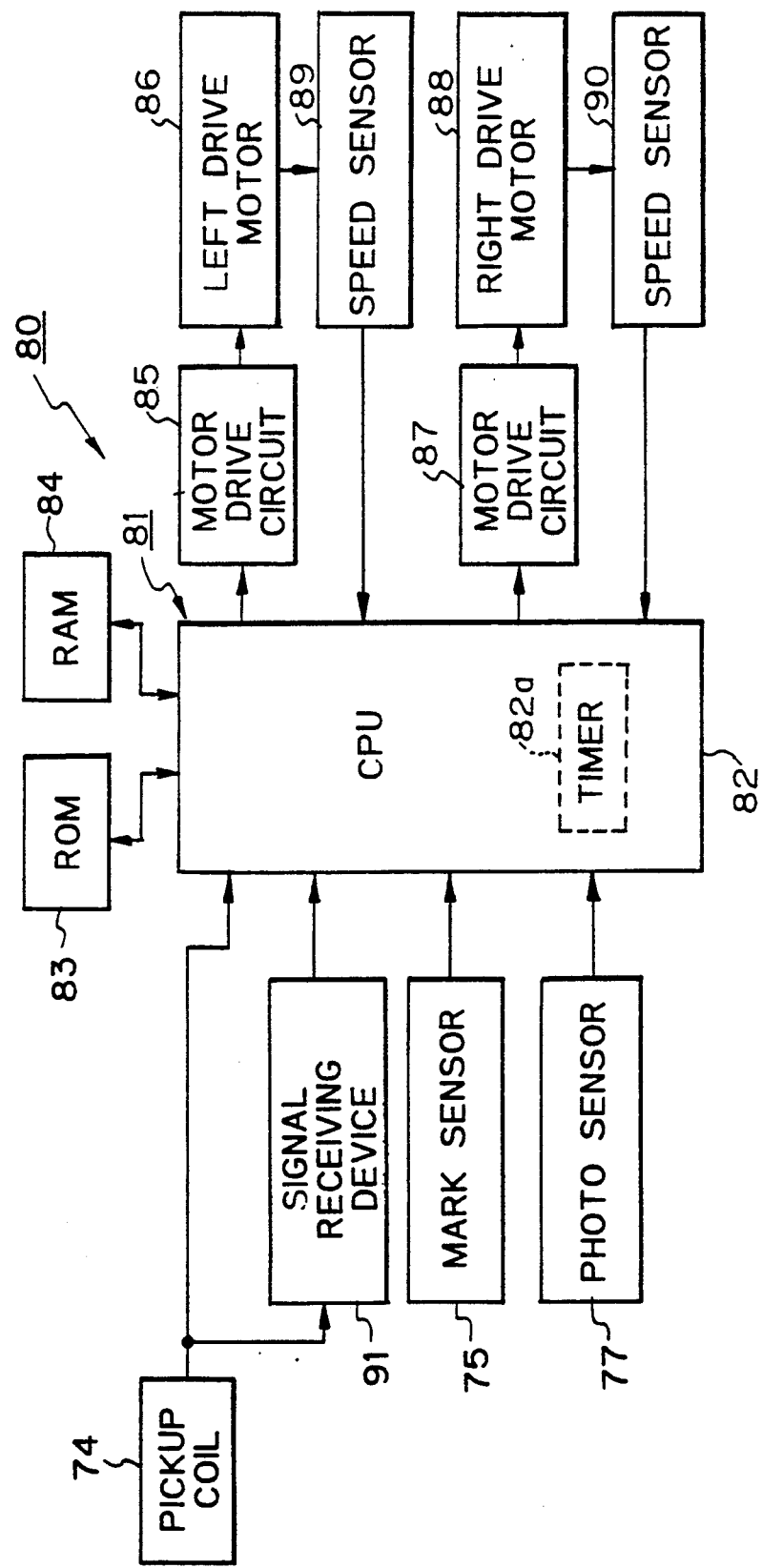
FIG. 5 is a block diagram of the control device installed in each respective automated guided vehicle.

FIG. 5 shows the constitution of the travel control device 80 installed on the AGV. The travel control device comprises a microcomputer 81 which includes a CPU 82, a ROM 83, a RAM 84, and a timer 82a. The CPU 82 controls the travelling of the AGV in accordance with programs stored in the ROM 83.

Motor drive circuits 85 and 87 control the speed and direction of rotation of direct current drive motors 86 and 88, respectively, in accordance with speed signals output by the CPU 82. The motor 86 (left side drive motor) drives left side drive wheel 72 and the motor 88 (right side drive motor) drives the right side drive wheel 72. The CPU 82 controls the speed and direction of rotation of the drive motors 86 and 88 by in accordance with signals received from speed sensors 89, 90, to thereby calculate the speed and direction of the AGV. The CPU 82 also controls the speed and direction of rotation of the drive motors 86, 88 through the motor drive circuits 85, 87, in accordance with detection signals output by the pickup coil 74, to travel the AGV along the guide wires.

The signal receiving device 91 also receives the detection signal output by the pickup coil 74, to demodulate the received detection signal, i.e., a low frequency alternating current supplied through the guide wire, and transmits a speed setting signal in response to the frequency of demodulated detection signal, to the CPU 82. This speed setting signal corresponds to the speed setting signal output by the speed controller 68 of the central control panel.

Also, the CPU 82 receives signals from the mark sensors 75, identifies the position indicating marks 14-16, 18-20 and 42-49, and controls the travelling of the AGV 1 and AGV 2 based on the information received from the respective position indicating marks.

The CPU 82 operates the drive motors 86, 88 to start a stopped AGV upon receiving a dispatch signal output by the dispatchers 22, 23, 50, 51 through the photo sensors 77.

In this embodiment, the AGV are controlled to travel at a predetermined slow speed (e.g., 0.75-1.75 m/min) in the first assembly area 9, the main assembly area 32, and the parts supply area 36, to facilitate the work of the operators M in these areas.

Upon receiving signals from the exit marks 18, 44, 48, output by the mark sensor 75, the CPU 82 determines that the AGV has left the first assembly area 9, the assembly area 32, or the parts supply area 36, respectively, and increases the travelling speed of the AGV.

The operation of the unmanned conveying system according to the present invention is now explained.

In the unmanned conveying system, according to the present invention, the AGV 1 and the AGV 2 are controlled by the respective CPU's 82, and automatically travelled along the first and second travel paths 3 and 4, respectively, and various kinds of workpieces W are loaded onto the AGV 1 at the loading station 10.

Accordingly, when an AGV 1 approaches the loading station 10 and the loading station mark 14 is detected by the mark sensor 75 of the AGV 1, the CPU 82 determines that the AGV 1 has reached the loading station 10 and stops the AGV 1 after it has travelled a predetermined distance from the loading station mark 14. Note this distance is measured by counting the number of rotations of the drive motors 86, 88.

The CPU 82 then stops the AGV 1 at the loading station 10 and starts the timer 82a for counting the time elapsed after this stop. During this time, the workpieces W are loaded onto the AGV 1 at the loading station 10 and the CPU 62 in the central control panel operates the first ID communicator 25 to input the type code of the workpiece W to the ID card 24 on the AGV 1. Then, after a predetermined time has elapsed, the CPU 82 starts the AGV 1.

Next, when, the AGV 1 approaches the nut runner unit 11, the mark sensors 75 of the AGV 1 detect the nut runner mark 15 on the travel path 3 and the CPU 82 determines that the AGV 1 has reached the nut runner unit 11, and stops the AGV 1 after if has travelled a predetermined distance from the nut runner mark 15. At this point, the second ID communicator 26 receives the signals indicating the type codes of workpieces W loaded on the AGV 1 and transmits these type code signals to the CPU 62. Upon receiving these type code signals, the CPU 62 operates the nut runner unit 11 through the drive circuit 67 to loosen the attaching bolts of the workpieces W by torques determined by the type of workpiece, and after the attaching bolts are loosened and a predetermined time has elapsed, the CPU 82 restarts the AGV 1 by operating the drive motors 86 and 88.

The CPU 82 then stops the AGV 1 when the stand-by mark 16 at the entrance to the first assembly area 9 is detected by the mark sensors 75.

At this point, the CPU 62 counts the time elapsed since a preceding AGV 1 was dispatched into the first assembly area 9, and then operates the first dispatcher 22 to emit a light signal. Upon receiving a light signal from the photo sensor 77, the CPU 82 starts the AGV 1 stopped at the standby mark 16 and that AGV 1 is dispatched into the first assembly area 9 when the preceding AGV 1 has travelled a predetermined distance in the first assembly area 9. Accordingly, the respective AGV's 1 are travelled in the first assembly area 9 while maintaining a predetermined distance therebetween.

The respective AGV's 1 pass in turn along the assembly stations 8 in the first assembly area 9, and the operators M at the respective assembly stations 8 assemble the parts on the workpieces W as required. As mentioned before, the respective AGV's travel at a slow speed while maintaining a constant distance therebetween, and therefore, the work of the operators M at the assembly stations 8 is facilitated.

After the workpieces W are loaded thereon, an AGV 1 (i.e., the AGV 1A in FIG. 1) passes the first point P1 in the first assembly area 9, and the third ID communicator 27 receives the microwave signals indicating the type code of the workpieces W from the ID cord 24 of the AGV 1. The third communicator 27 then outputs these type code signal of the workpieces W loaded on the AGV 1A to the CPU 62, and the CPU 62 identifies the type of workpieces W and transmits a signal to the fifth ID communicator 53 to write the same type code to the ID card 52 on an AGV 2 passing the second point P2 on the second travel path 4 (i.e., the AGV 2A in FIG. 1). Also, the CPU 62 displays the type code now written to the ID card 52 of the AGV 2A on the display 70, to inform the operators M in the parts supply area 36 of the type of workpieces W which will be loaded onto the AGV 2A at the transfer loading station 12.

After passing the first point P1 in the first assembly area 9, the AGV 1A leaves the first assembly area 9, after completion of the required assembly work, the mark sensors 75 of the AGV 1A detect the exit mark 18, and upon receiving the detection signal from the mark sensor 75, the CPU 82 determines that the AGV 1A is no longer in the first assembly area and increases the travelling speed of the AGV 1A. The AGV 1A then, travels to the transfer loading station 12, and when the transfer loading station mark 19 is detected by the mark sensors 75, the CPU 82 immediately stops the AGV 1A at the transfer loading station mark 19.

Meanwhile, the AGV 2A, after passing the second point P2 on the second travel path 4, travels slowly in the parts supply area 36, and while the AGV 2A is passing the parts supply stations 35, the operators M select the machine parts according to the type code of the workpiece indicated on the display 70 and load them onto the parts rack 78 of the AGV 2A.

When the AGV 2A, with all the required parts loaded thereon, leaves the parts supply area 36, the exit mark 48 is detected by the mark sensors 75 and the CPU 82 increases the speed of the AGV 2A. Then, upon detecting the stand-by mark 49 upstream of the transfer loading station 12, the onboard CPU 82 immediately stops the AGV 2A at the stand-by mark 49.

In this embodiment, the travelling speeds of the AGV 1A and the AGV 2A are selected in such a manner that the AGV 1A and the AGV 2A reach the transfer loading station mark 19 and the stand-by mark 49 respectively, at almost the same time. While the AGV 1A and the AGV 2A are stopped at the transfer station mark 19 and the stand-by mark 49, the CPU 62 reads out the type codes stored in the ID cards 24 and 52 through the fourth and the sixth ID communicators 28, 54, and compares the type codes stored in the ID cards 24 and 52, and if these type codes coincide, the CPU 62 determines that the types of parts loaded onto the AGV 2A are same as the type of workpieces W on the AGV 1A, and permits the transfer of the workpieces W from the AGV 1 to the AGV 2. Thus, the CPU 62 operates the second dispatcher 23 to emit a light signal for starting the AGV 2. Upon receiving the light signal from the photo sensor 77 the CPU 82 starts the AGV 1, and stops the AGV 1 after it has travelled along the common travel path 7 for a predetermined distance from the transfer loading mark 19. Accordingly, the AGV 1 is stopped at the transfer loading station 19.

The workpieces W are then unloaded from the AGV 1A at the transfer loading station 19, and after a predetermined time has elapsed and the unloading of the workpiece W is completed, the CPU 82 restarts the AGV 1A which then travels to the first charging station 13. After passing the charging station mark 20, the AGV 1A enters the first charging station 13, and the batteries of the AGV 1A are charged as required. After the charging is completed, the AGV 1A travels to the loading station 10 to be loaded with another workpiece W.

When a predetermined time has elapsed after the dispatch of the AGV 1A from the transfer loading mark 19, the CPU 62 operates the fourth dispatcher 51 to emit a light signal for starting the AGV 2A. Upon receiving this light signal, AGV 2A is started and travelled along the common travel path 7 until it passes the transfer loading station mark 42. When the transfer loading station mark 42 is detected by the mark sensors 75, the CPU 82 stops the AGV 2A after it has travelled a predetermined distance from the transfer loading station mark 42, namely, the AGV 2A is stopped at the transfer loading station 12, the workpieces W unloaded from the AGV 1A are loaded onto the AGV 2A, and after a predetermined time has elapsed and the loading of the workpieces is completed, the AGV 2A is restarted and travelled to the main assembly area 32.

The AGV 2A is stopped at the entrance of the main assembly area 32 and dispatched into the said area in the same manner as for the AGV 1 when entering the first assembly area 9.

The AGV 2A is then travelled slowly through the main assembly area 36 while maintaining a constant distance from the preceding AGV 2, and while the AGV 2A is passing the respective main assembly stations 31, the machine parts loaded onto the AGV 2A at the parts supply station 36, and the machine parts disposed at the main assembly stations 31, are assembled to the workpiece W.

After the completion of the assembly in the main assembly stations 31, the AGV 2 passes the exit mark 44 at the exit of the main assembly area 32, and upon detecting the exit mark 44 by the mark sensors 75, the CPU 82 increases the travelling speed of the AGV 2A on the way to the unloading station 33. When the AGV 2A passes the unloading station mark 45, the CPU 82 stops the AGV 2A after it has travelled a predetermined distance from the unloading station mark 45. Namely, the AGV 2A is stopped at the unloading station 33, and after the workpiece W is unloaded at the unloading station 33 and a predetermined time has elapsed, the AGV 2A is restarted and travelled to the second charging station 34. After passing the charging mark 46, the AGV 2A enters the second charging station 13, and the batteries of the AGV 2A are charged as required. After the charging is completed, the AGV 2A is travelled to the parts supply area 36 to receive the machine parts required for next workpieces W.

If the type code read from the ID card 24 of the AGV 1A stopped at the transfer loading station mark 19 and the type code read from the ID card 25 of the AGV 2A stopped at the stand-by mark 49 do not coincide, the CPU 62 in the central control panel determines that the type of workpieces W on the AGV 1A and the type of machine parts on the AGV 2A do not coincide, and prohibits the transfer of the workpieces W. In this case, the CPU 62 does not operate the dispatchers 23 and 51 but holds the AGV 1 and AGV 2 at their respective positions and displays an error signal on the display 70, so that the operators M in the parts supply area 36 can take the appropriate steps to correct the error.

As explained above, in the unmanned conveying system according to the present invention, an AGV on one travel path can be correlated to another AGV on another travel path. Therefore, when applied to a manufacturing process such as a machine assembly, the manufacturing process can be carried out in two steps. Namely, the respective manufacturing steps comprise a group of AGV's conveying the workpieces W along the respective travel path, and a transfer of workpieces from one group of AGV in one manufacturing step to another group of AGV in another manufacturing step. In line with the transfer of the workpieces W, the required parts for the respective workpieces W can be loaded beforehand onto the AGV to which the workpieces will be transferred. Accordingly, the many items, small lot manufacturing processes can be effectively carried out by utilizing the independent mobility of the respective AGV's. The number of workpieces conveyed can be easily changed by increasing or decreasing the number of AGV 1 and AGV 2, and further, the number of AGV on the travel paths 3 and 4 can be changed, respectively, i.e., the number of AGV 1 and AGV 2 need not be the same. Accordingly, the degree of freedom of constituting an unmanned conveying system is greatly increased.

In the above embodiment, the AGV 1 and AGV 2 are dispatched from the entrances of the respective assembly areas 9 and 32 at predetermined intervals, to maintain a constant distance between the AGV's, but this constant distance between the AGV's can be maintained by dispatching an AGV when the preceding AGV has reached a predetermined point in the assembly areas 9, 32.

Figure 9:
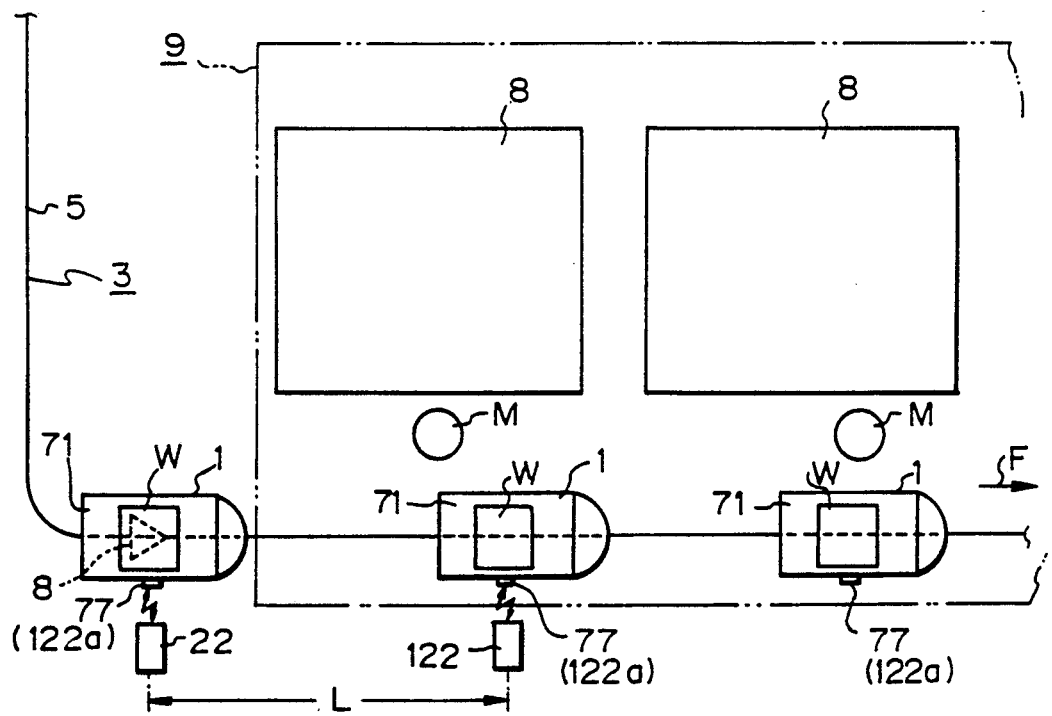
FIG. 9 is a plan view of the first assembly area, on an enlarged scale, showing another embodiment of the system used for maintaining a predetermined interval between the automated guided vehicles.

FIG. 9 shows an embodiment using this procedure. As shown in the Figure, an AGV detector 122 is located in the first assembly area 9 at a predetermined distance L from the stand-by mark 16. The AGV detector 122 comprises a reflex type photo sensor and is able to sense the AGV 1 by emitting a light beam and receiving the light beam reflected by the AGV 1.

Accordingly, a mirror 122a is installed on the AGV below the photo sensor 77.

In this embodiment, the AGV detector 122 transmits a signal upon sensing the AGV 1, and upon receiving this signal, the CPU 62 determines that the preceding AGV 1 has travelled the distance L from the stand-by mark 16, and thus dispatches the AGV 1 stopped at the stand-by mark 16 by emitting a light signal from the first dispatcher 22, whereby the predetermined distance L is established between the dispatched AGV 1 and the preceding AGV 1. Since the AGV 1 are programmed to travel at a constant slow speed in the assembly area 9, the distance L between the AGV's 1 is maintained in the assembly area 9. The distance L can be set as required by changing the position of the AGV sensor 122.

Figure 10:
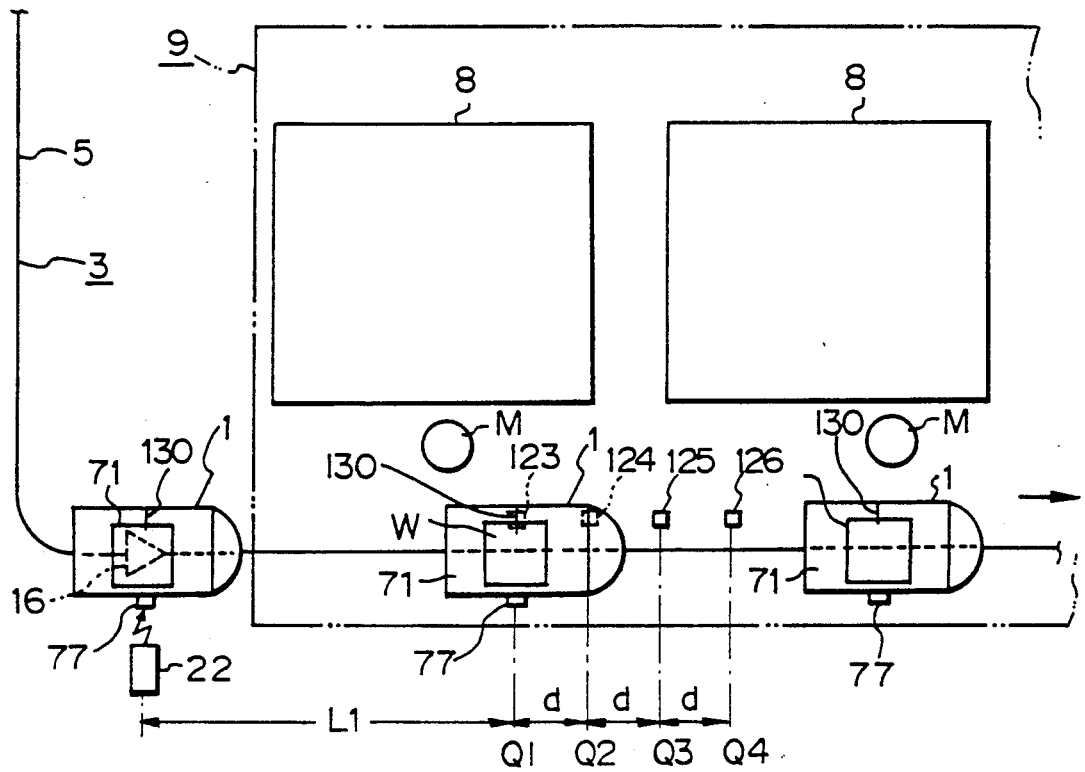
FIG. 10 is a plan view similar to FIG. 9 and showing a further embodiment of the system used for maintaining a predetermined interval between the automated guided vehicles.

FIG. 10 shows a variation of the embodiment in FIG. 9. In this case, a total of four AGV detectors 123-126 are located at the points Q1-Q4 along the travel path 3. These points Q1-Q4 are arranged at a predetermined spacing d, and the point Q1 is located at the distance L1 from the entrance mark 16.

Figure 11:
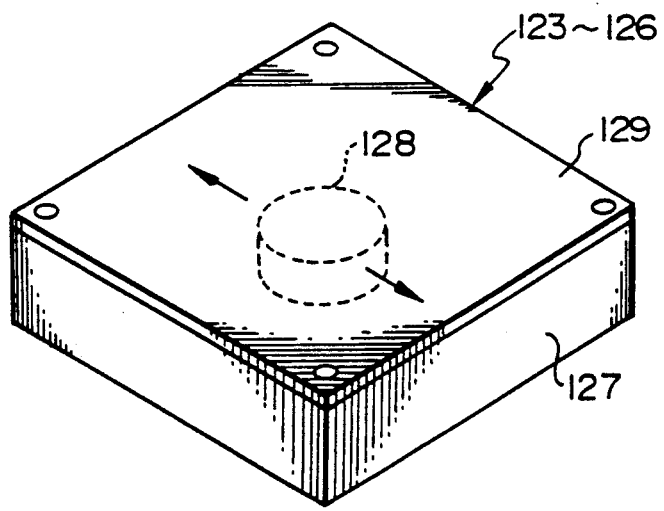
FIG. 11 is a perspective view of a detector used in the embodiment illustrated in FIG. 10.

As shown in FIG. 11, the respective AGV detectors 123-126 have an identical construction, which comprises a flat case 127 and a magnetic reed switch 128 encased therein, and a cover plate 129. The position of the magnetic reed switch 128 is adjustable within the case 127. The AGV detectors 123-126 are installed on the floor along the travel path 3 in such a manner that the upper surfaces of the cover plates 129 are at the same level as the floor surface.

As shown in FIG. 10, the AGV 1 comprise a magnet 130 at the center of the side of the body 71, at the bottom thereof, to actuate the magnetic reed switches 128 of the AGV detectors 123-126 as they pass over the AGV detectors 123-126.

The AGV detectors 123-126 transmit signals to the central control panel when a AGV 1 passes over the detectors.

A selector switch (not shown in the Figure) is provided on the central control panel to selectively supply only one signal from the AGV detectors 123-126 to the CPU 62. Namely, the AGV detector transmitting the signal to the CPU 62 can be selected by operating the signal selector switch as required.

Upon receiving the signal from the selected AGV detector, the CPU 62 dispatches the AGV 1 stopped at the entrance mark 16, and therefore, four different distances between the AGV's 1 (i.e., L1, L1+d-L1+3d) can be set in this embodiment. Also the distances d between the magnetic reed switches can be adjusted by changing the position thereof within the case 127 of the AGV detector, and therefore, the distance between the AGV's can be precisely adjusted.

Although the arrangement of only the first assembly area 9 is described, it should be understood that a similar arrangement can be applied to the main assembly station 32.

In the unmanned conveying system according to the present invention, control functions can be incorporated by which the power sources of the respective AGV, are switched ON and OFF at the same time by signals output by the central control panel.

Figure 12:
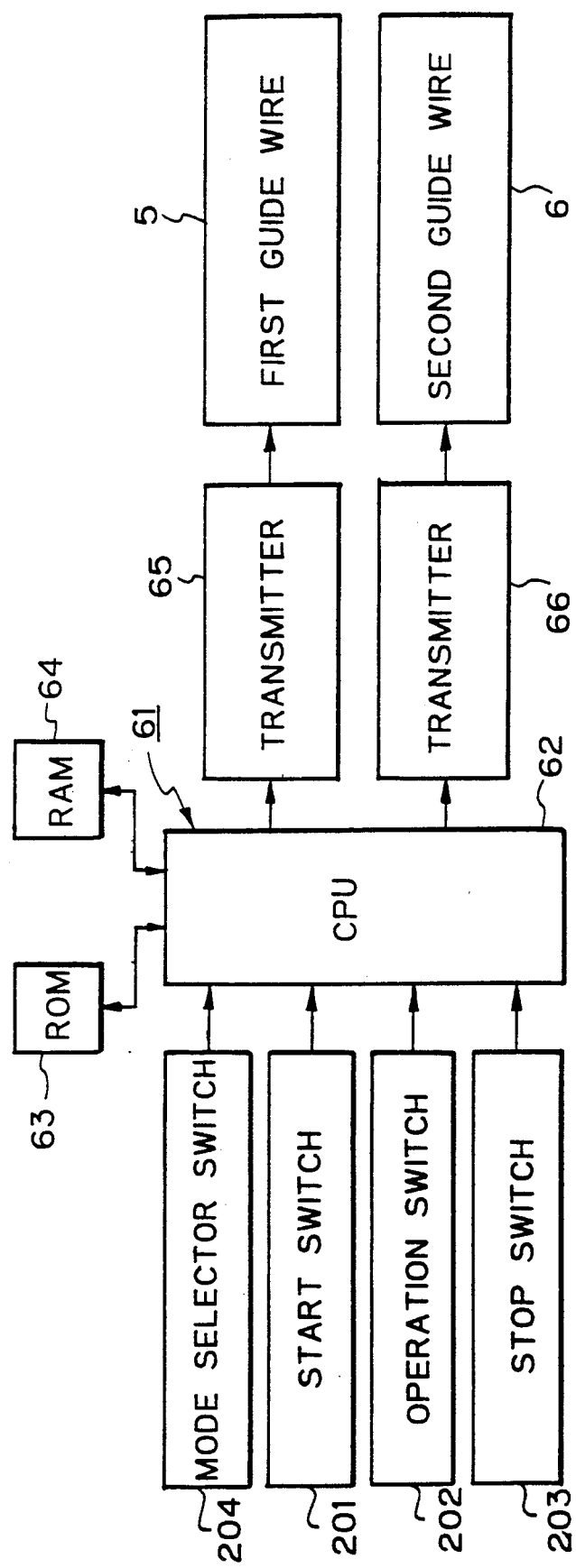
FIG. 12 is a block diagram showing main parts of an embodiment of the operation control device in the unmanned conveying system for controlling the power source operations.

FIG. 12 shows the arrangement of this control circuit in the central control panel.

Note, only the elements necessary to control the power sources of the AGV are shown in FIG. 12, and the other elements shown in FIG. 4 are also provided for the control circuit in this embodiment, but are not shown in this Figure.

As shown in FIG. 12, the control circuit is provided with switches 201-204, which include a start switch 201 for transmitting a signal to the CPU 62 for switching ON the power sources of the respective AGV's; an operation switch 202 for transmitting a signal to the CPU 62 for starting the operation of the respective AGV's; a stop switch 203 for transmitting a signal to the CPU 62 for switching off the power sources of the respective AGV's; and a mode selector switch 204 for transmitting a signal to the CPU 62 which determines the isolation mode of the power sources of the respective AGV's when the stop switch 203 is operated. The mode selector switch 204 can select two modes of stop operations, i.e., a "sleep mode" and a "terminate mode". Namely, when the stop switch 203 is operated in the sleep mode, the respective AGV's can be started by operating the start up switch 201, but if the stop switch is operated in the terminate mode, the power sources of the AGV are completely isolated, and it is necessary to individually switch ON the power switches of the respective AGV's, to start the AGV's.

In this embodiment, when the switches 201-203 are operated, the transmitters 65 and 66 transmit signals through the guide wires 5 and 6, by which the power source of the AGV is switched OFF or ON or the AGV is travelled.

During normal operations, the transmitters 65, 66 send low frequency weak alternating current through the guide wires 5, 6 in the manner as explained before.

Figure 13A:
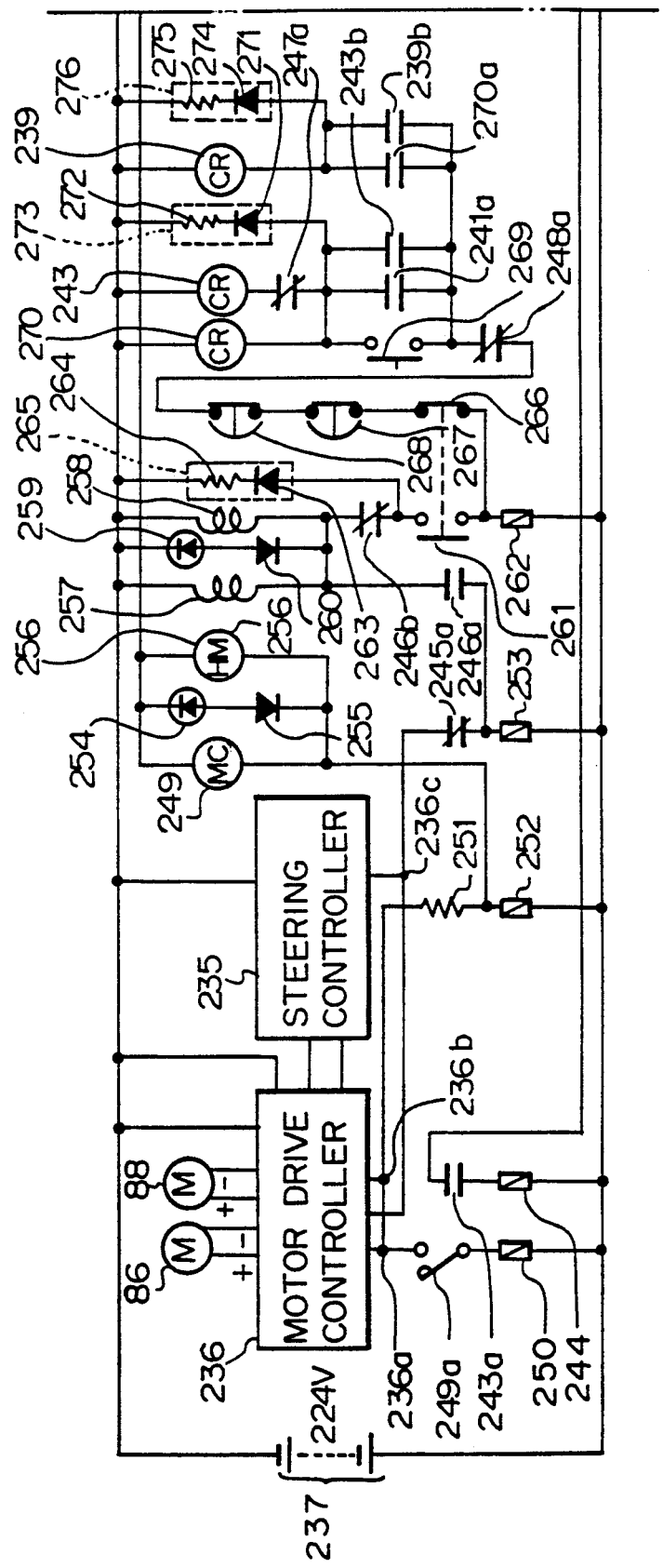
FIG. 13A is a first portion of an electrical circuit diagram of the automated guided vehicle of the embodiment shown in FIG. 12.
Figure 13B:
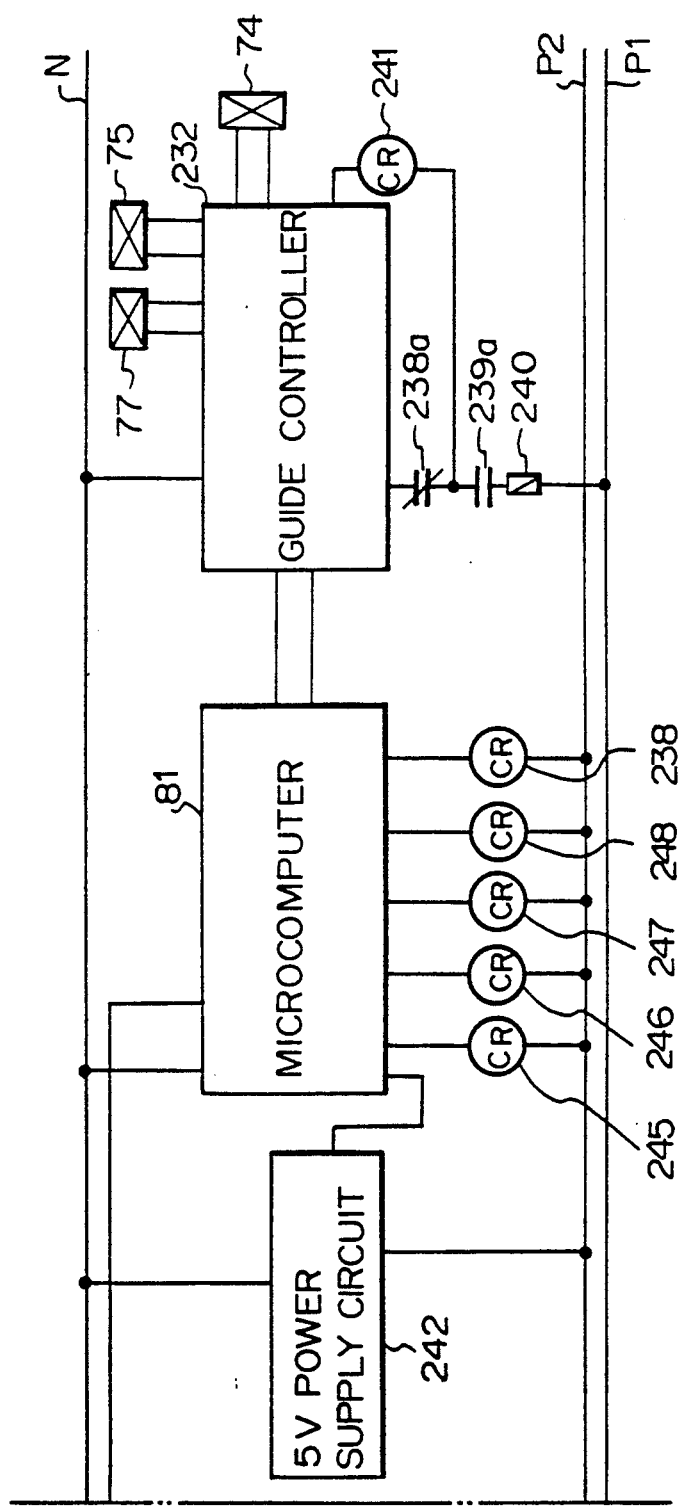
FIG. 13B is the second portion of an electrical circuit diagram of the automated guided vehicle of the embodiment shown in FIG. 12.

FIG. 13 shows the electrical circuit of the AGV 1 and AGV 2 utilized to obtain the required function of this embodiment. In the Figure, the same reference numbers indicates the same elements as shown in FIG. 5.

As shown in the Figure, a microcomputer 81, which includes a ROM 83 and a RAM 84 (not shown in the Figure) is provided, and is connected to a guide controller 232 which receives signals from the CPU 62 in the central control panel. Accordingly, the pickup coil 74, mark sensors 75, and photo sensor 77 are connected to the guide controller 232.

The guide controller 232 also demodulates the signals received from the pickup coil 74 and transmits predetermined signals to the microcomputer 81 in accordance with the kinds of signals received. A motor drive controller 236 drives left and right drive motors 233, 234 in accordance with signals from a steering controller 235 operated by signals output by the microcomputer 81. The microcomputer 81 and the controllers 235 236 are powered by 24 V batteries 237 provided on the AGV.

Three bus conductors N, P$_1$, and P$_2$ are provided in the circuit. The bus N is connected to the negative terminal of the batteries 237; the first bus P1 is connected to the positive terminal of the batteries 237; and the second bus P2 is connected to the first bus P1 via a second contactor 243a and a fuse 244.

The positive terminal of the guide controller 232 is connected to the bus P1 via a normally closed contact 238a and normally open contact 239a, and a fuse 240. Also an eighth relay 241 is connected to the guide controller 232 and contact 239a, in parallel to the contact 238a, and is energized by a signal from the guide controller 232.

A 5 V power supply circuit 242 is connected to the bus P2 and N and is provided as a power source for the microcomputer 81. This 5 V power supply circuit 242 steps down the 24 V voltage of the batteries 237 to 5 V, before supplying same to the microcomputer 81. Third to eighth relays 245-248 and a ninth relay 238 are connected between the microcomputer 81 and the second bus P2.

The motor drive controller 236 has one negative terminal, connected to the bus N, and three positive terminals 236a, 236b, 236c. The terminal 236a is connected to the first bus P1 via a contact 249a and a fuse 250, and the terminal 236a and the terminal 236b are connected to the first bus P1 via a resistance 251 and a fuse 252. The terminal 236c is connected to the first bus P1 via a third contact 245a and a fuse 253, and a positive terminal of the steering controller 235 is connected to the terminal 236c of the motor drive controller 236.

Diodes 254 and 255, which are connected in series, a travel contactor 249, and an hour meter 256 are connected to the microcomputer 81 and to the first bus P1 via the fuse 252.

A pair of solenoids 257 and 258, which actuate the brake of the drive wheels 72 of the AGV, and a pair of diodes 259, 260 arranged in series, are connected between the bus N, and via a fourth contact 246a and a fuse 253, to the first bus P1. Also the terminal 236c of the motor drive controller 236 is connected the first bus P1 via the fuse 253.

A fourth contact 246b and a first brake release switch 261, arranged in series, are connected between the solenoids 257, 258 and the first bus P1, via a fuse 262.

A brake release indicating lamp 265 composed of a light emitting diode (LED) 263 and a resistance 264 is connected to the first bus P1 via the switch 61 and the fuse 62.

A second brake release switch 266 and a pair of emergency stop switches 267 and 268, are arranged in series between the seventh contact 248a and the bus N. A first relay 270, a second relay 243 and a power source indicating lamp 273 composed of an LED 271 and a resistance 272 are arranged in parallel. The seventh contact 248a, the relays 270, 243, and the lamp 273 are connected to a main power switch 269, an eighth contact 241a, and a second contact 243b, which are arranged in parallel. Also a fifth contact 247a is arranged between the second relay 243 and the main power switch 269.

A sixth relay 239 and a "ready lamp" 276 composed of an LED 274 and a resistance 275 are arranged in parallel between the bus N and a pair of contacts 239b, 270a, which are also arranged in parallel and connected to the seventh contact 248a.

The first relay 270, the second relay 243, and the eighth relay 241 constitute a "SWITCH OFF" circuit, and the first relay 270, the second relay 243, and the fifth relay 247 constitute a "SWITCH OFF" circuit.

The operation of the electrical circuit in FIG. 13 is now explained.

At the initial start of the AGV, the power source of the microcomputer 81 of the central control panel is switched ON to activate the CPU 62, and then the start switch 201 of the central control panel is switched ON, which causes the CPU 62 to operate the transmitters 65 and 66 in FIG. 12 to transmit stop signals through the guide lines 5 and 6. Because these stop signals are transmitted before the main power switches 269 of the AGV are switched ON, the brake solenoids 257, 258 are operated when the main power switch 269 is switched ON, and thus any movement of the AGV is prohibited.

In this condition, the main power switches 269 of the respective AGV are switched on by operators, whereby the first and second relays 270 and 243 in FIG. 13 are energized and the power source indicating lamp 273 is made ON. Also the first contact 270a of the first relay 270 and the second contacts 243a, 243b of the second relay are closed, and electric power is supplied to the microcomputer 81 from the 5 V power source circuit 242 via the second contact 243a. Also, while the contact 243b is closed, the relay 270, 243 and the lamp 273 are energized.

Also, by closing the first contact 270a, the "ready lamp" 276 is lit to show that the AGV can be started, and the sixth relay 239 is energized to close the sixth contacts 39a and 39b.

The sixth contact 239b holds the energized condition of the sixth relay 239 and ready lamp 276, and electric power is supplied to the guide controller 232 by closing the sixth contact 239a, whereby electric power is supplied to the microcomputer 81 and associated device, including the guide controller 232.

Then the guide controller 232 receives a stop signal through the pickup coil 74 and transmits the stop signal to the microcomputer 81. Upon receiving the stop signal, the microcomputer 81 energizes the fourth relay 246, to close the contact 246a and open the contact 246b.

By closing the contact 246a, the solenoids 257 and 258 are energized, and the brakes of the drive wheels 72 are operated to prevent an unintentional start of the AGV.

When the operation switch 202 is operated in this condition, the CPU 62 in the central control panel transmits predetermined travel signals through the transmitters 65 and 66. When the microcomputer 81 receives the travel signal from the pickup coil 74 and the guide controller 232, the microcomputer 81 activates the hour meter 256 and energizes the travel contactor 249 to close the contact 249a, whereby electric power is supplied to a motor drive controller 236, and the drive motors 233, 234 are operated. At the same time, the microcomputer 81 deenergizes the fourth relay 246 to open the contact 246a and close the contact 246b, whereby the solenoids 257, 258 are deenergized and the brakes of the drive wheel 25 are released, and thus the AGV starts to travel.

The above operation is carried out in each of the respective AGV's at the same time, so that the respective AGV's start to travel simultaneously.

After the start, the respective AGV's are travelled along the travel path 3 and 4 under the control conditions described before.

In this embodiment, two modes of stopping the AGV, i.e., the "terminate mode" and the "sleep mode", are used. The "sleep mode" is used to stop the AGV for a relatively short time (e.g., for ten hours or more). If the stop switch 203 is operated in this mode, the AGV can be restarted from the central control panel without operating the main power switches 269 of the respective AGV's, and thus this mode is convenient when stopping the AGV after working hours on a weekday, as it is not necessary to start the respective AGV's by individually operating the main power switches 269 thereof. Also this mode is used for a temporary stop of the AGV, for example, when the type code of the workpiece W on the AGV 1 does not coincide with the type code of the machine parts on the AGV 2, as in the first embodiment.

The sleep mode is selected by the selector switch 204 on the central control panel, and when the stop switch 203 is operated in this mode, the CPU 62 transmits stop signals through the transmitters 65 and 66, and after a predetermined time has lapsed, the CPU 62 transmits a sleep code signal through the transmitters 65 and 66. After transmitting the sleep code, then CPU 62 switches off the transmitters 65 and 66.

When the stop code is received by the microcomputer 81 from the guide wires 5 and 6 via the pickup 74 and the guide controller 232, the microcomputer 81 stops the drive motors 233 and 234 and operates the brakes of the drive wheels 72, to stop the AGV.

Then, when the microcomputer 81 receives the sleep code, it energizes the fifth relay 247 to open the fifth contact 247a, which deenergizes the second relay 243. This causes the second contacts 243a, 243b to open, and thus the 5 V power source circuit 242 for the microcomputer 81 is isolated and the first relay is deenergizes to open the first contact 270a.

In this condition, the sixth relay 239 is still energized, the ready lamp 276 is on, and the power supply to the guide controller 232 is maintained. Nevertheless, since the microcomputer 81 is switched OFF, the AGV cannot be operated in this condition.

To restart the AGV, the start switch 201 on the central control panel is operated, and when the start up switch 201 is operated, the CPU 62 at the central control panel switches on the transmitters 65 and 66 and transmits stop signals to the guide wires 5 and 6.

As explained above, since the power supply to the guide controller 232 is maintained, the stop signal is received by the guide controller through the pickup coil 74, and the guide controller then energizes the eighth relay 41 to close the eighth contact 241a, whereby the relays 270 and 243 are energized and the power source indicating lamp 73 is made on. Accordingly, the 5 V power source circuit 242 is activated, to supply electric power to the microcomputer 81, and the AGV's become ready for operation.

In this condition each respective AGV can be started simultaneously from the central control panel by operating the operation switch 204 as explained before.

In the sleep mode, each respective AGV can be simultaneously stopped and restarted, and the operation after restarting can be resumed without any adjustment of the relative position of the AGV.

Additional stop switches, which are connected to the CPU 62, can be arranged at positions near the respective operators M. This arrangement enables the operators M to stop the AGV in the same manner as for belt conveyors.

The "terminate mode", on the other hand, is used to stop the AGV for a relatively long time (one day or more), and if the stop switch 203 is operated in this mode, the power source of the AGV is completely isolated and the AGV cannot be restarted from the central control panel.

This mode prevents consumption of the battery power during long stops such as over a weekend or for holidays.

When the terminate mode is selected by the selector mode switch 204 and the stop switch 203 is operated, the CPU 62 in the central control panel transmits the stop signals to the guide wire 5, 6 through the transmitters 65 and 66, and upon receiving the stop signal, the microcomputer 81 stops the AGV. The CPU 62 then transmits a terminate code signal to the guide wire 5, 6, through the transmitters 65, 66, and thereafter, switches OFF the transmitters 65, 66.

Upon receiving the terminate code signal, the microcomputer 81 energizes the seventh relay 248 to open the seventh contact 248a, whereby the first relay 270, the second relay 243 and the sixth relay 239 are deenergized, and consequently, the second contact 243a of the second relay is opened to isolate the 5 V power supply 242 to the microcomputer 81, and the sixth contact 239a opens to isolate the power supply to the guide controller 232.

In this condition, the power supplies to the microcomputer 81 and associated devices including the guide controller 232 are completely isolated, and thus the AGV cannot be started from the central control panel.

Further, since the batteries 237 are isolated, there is no consumption of the power of the batteries during the stopping time.

To start the AGV after it is stopped in this mode, the main power switches 269 of the respective AGV's must be switched ON.

The present invention is not restricted to the illustrated embodiments, but can be modified without departing from the scope and spirit of this invention, for example:

(A) In the embodiment illustrated in FIG. 1, the manufacturing process is constituted by two travelling paths 3, 4, but according to the present invention, the manufacturing process can be constituted by more than three travelling paths, each constituting a manufacturing step and to correlate the AGV's on the respective travel paths.

Figure 14:
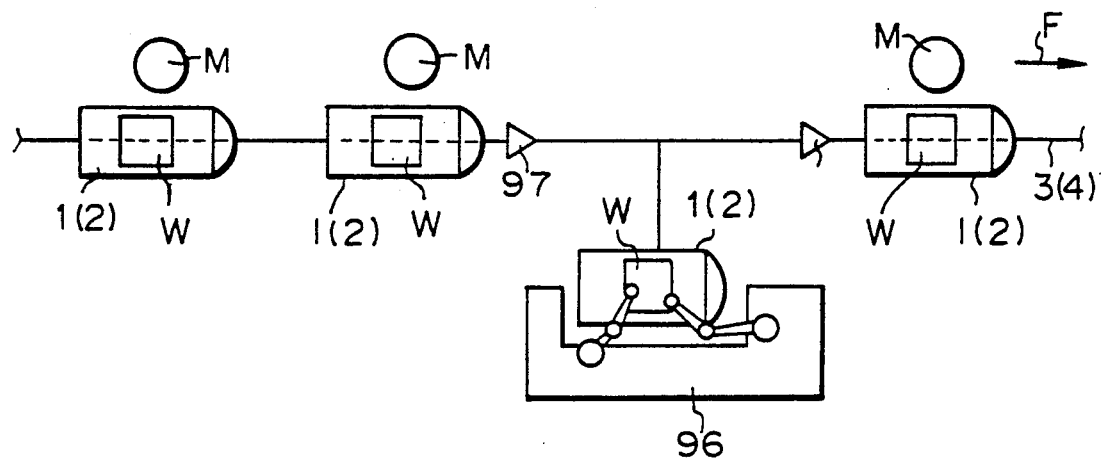
FIG. 14 is a plan view of an automatic assembly station employed in another embodiment of the present invention.

(B) In the embodiment illustrated in the FIG. 1, the assembly of the machine parts to the workpieces W is carried out by the operators M, but as shown in FIG. 14, automatic assembly stations 96 employing assembly robots can be arranged at positions apart from the travel paths 3, 4. In this case, the AGV's are designed to be able to travel also transversely to the travel path. By this arrangement, the assembly work by the assembly robots is carried out at positions remote from the operators M. The position indicating marks 97, 98 in the Figure are arranged to indicate that the AGV has reached the entrance or the exit of the automatic assembly station 96.

(C) In the embodiments, the machine parts are loaded onto the AGV in the parts supply area 36 by the operators M, but automatic loading machines can be used instead for loading the machine parts.

(D) In the embodiments, ID cards 24, 52 are used for storing the type codes, but the RAM 83 of the AGV's microcomputer 81 can be used for recording the type codes.

(E) In the embodiments, the display 70 is disposed in the parts supply area 36, but the display can be installed on each AGV to display the type code.

Figure 15:
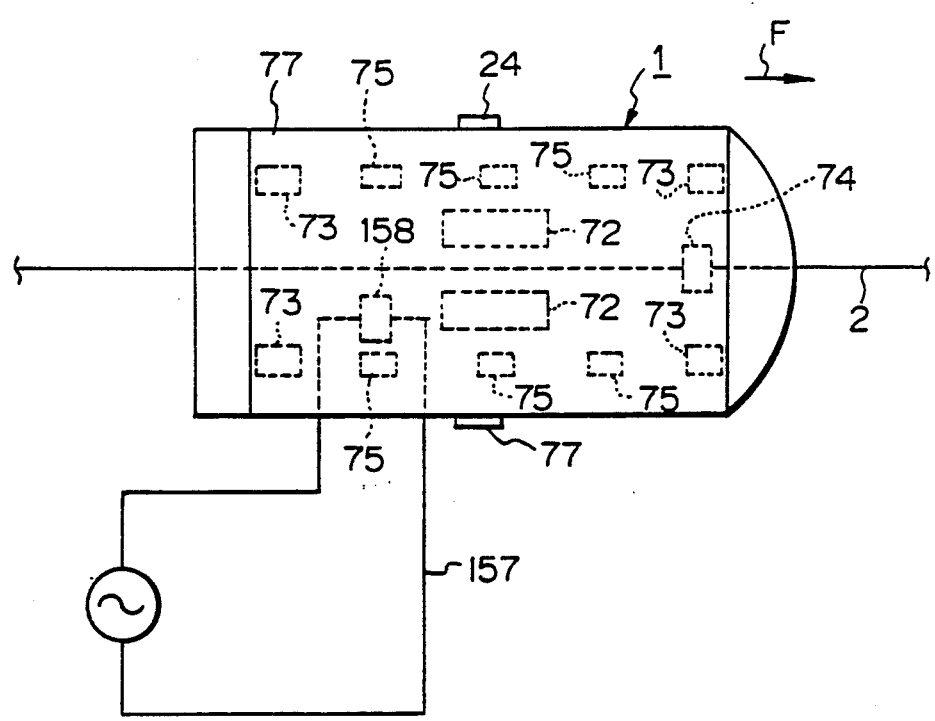
FIG. 15 is a plan view similar to FIG. 7, showing another embodiment of the dispatcher in FIG. 1; and, FIG. 16 is a plan view of a charging station, on an enlarged scale.

(F) In the embodiments, the dispatchers 22, 23 50, 51 are constituted by light signal emitting devices, but other type dispatchers can be used. For example, as shown in FIG. 15, a loop coil 157 disposed on the floor for sending a low frequency weak alternating current therethrough and a pickup coil 158 on the AGV, which is sensitive to the low frequency weak alternating signal, can be used.

(G) In the embodiment of FIG. 9, reflex type photo sensors or magnetic reed sensors are used as the AGV detector, but limit switches, proximity sensors, or a hole device, can be used as the AGV detectors.

(H) In the embodiments, the AGV 1 and 2 arrives at the entrance of the assembly area 9, 32 just after the preceding AGV is dispatched, but other standby points can be located upstream of the entrances, and the AGV stopped at these standby points until the preceding AGV is dispatched from the entrance of the assembly area 9, 32.

(I) In the embodiments, the AGV are dispatched from the entrance of the assembly area at predetermined intervals, based on a lapse of time after the preceding AGV is dispatched or based on a detection signal of the preceding AGV at a predetermined point in the assembly area, but both systems can be employed and the AGV dispatched only when both conditions are met.

(J) In the embodiment illustrated in FIGS. 12 and 13, all of the AGV's are switched OFF at the same time, but the power supply to the AGV of the charging stations 13 and 34 can be maintained until the automatic charging of the batteries is completed.

Figure 16:
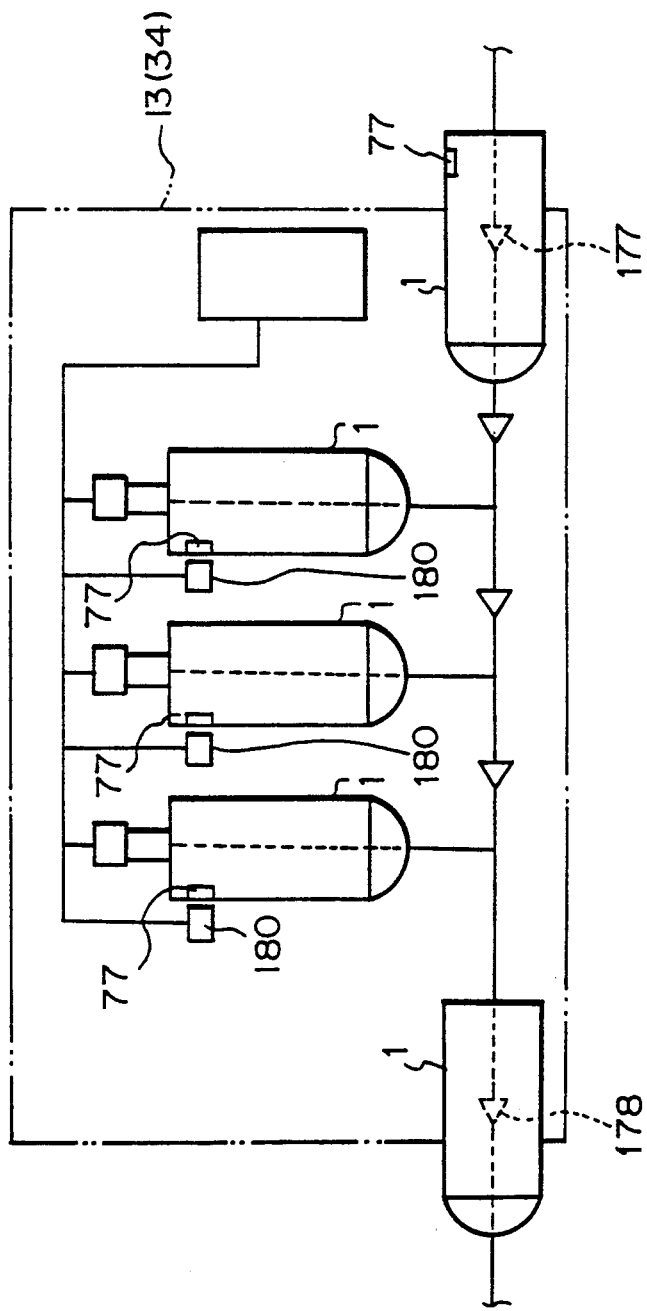

For example, as shown in FIG. 16, the entrance mark 177 and the exit mark 178 are arranged at the entrance and the exit of the charging station 13 and 34, and the microcomputer 81 is programmed in such a manner that it does not cut the power supplied to the AGV when the AGV is located between the entrance mark 177 and the exit mark 178. In this case, light signal emitting devices 180 are installed at the charging position of the AGV, and when the charging of the batteries is completed, the devices 180 are operated to output light signals to the photo sensors 77 of the AGV to cause the microcomputer of the AGV to switch OFF the power supply.

We claim:

1. An operation control system for automated guided vehicles conveying articles along an unmanned conveying system comprising:
    a first travel path loop along which only a first group of the automated guided vehicles are automatically travelled;
    a second travel path loop along which only a second group of automated guided vehicles are automatically travelled;
    a common travel path along which both the first group and the second group of automated guided vehicles are travelled, to transfer articles from the automated guided vehicles of one group to the automated guided vehicles of the other group;
    a correlation means for correlating one automated guided vehicle of the first group with another automated guided vehicle of the second group;
    a transfer control means for controlling said transfer of articles carried by said automated guided vehicles along the common travel path in such a manner that said transfer of articles is permitted only between the automated guided vehicles correlated by said correlation means.

2. An operation control system for automated guided vehicles according to claim 1, wherein a first assembly area for a first assembly of workpieces is located along said first travel path loop and a second assembly area for a main assembly of said workpieces is located along said second travel path loop,
    said workpieces being conveyed by the first group of automated guided vehicles, and after said first assembly of said workpieces is completed, being transferred to corresponding correlated automated guided vehicles of the second group at a transfer loading station located along said common path.

3. An operation control system for automated guided vehicles according to claim 1, wherein:
    said correlation means comprises;
        a first recording means arranged on each automated guided vehicle of the first group, for storing information corresponding to the automated guided vehicle on which said recording means is arranged;
        a second recording means arranged on each automated guided vehicle of the second group, to which information corresponding to the automated guided vehicle on which said second recording means is arranged can be written;
        a first read out means for reading information stored in said first recording means, said first read out means being arranged along said first travel path loop at a position upstream of said common travel path;
        an input means for writing information to said second recording means, said input means being arranged along said second travel path loop at a position upstream of said common travel path;
        a means for controlling said first read out means and said input means to input information read out from said first recording means to said second recording means;
    wherein said transfer control means comprises:
        a second read out means arranged at an entrance of said common travel path for reading information from the first recording means of an automated guided vehicle of the first group entering said common travel path;
        a third read out means disposed at the entrance to said common travel path for reading information from the second recording means of an automated guided vehicle of the second group before said vehicle enters said common travel path;
        means for comparing said information acquired by the second and the third read out means to determine whether said automated guided vehicle of the first group entering the common travel path and said automated guided vehicle of the second group about to enter the common travel path have a predetermined relationship, and based on said determination, said means controls the travel of both of said automated guided vehicles.

4. An operation control system for automated guided vehicles according to claim 3,
wherein each of said first recording means and said second recording means comprises an erasable memory medium, a transmitter for sending microwave signals indicating the information stored in said memory medium, a signal receiver for receiving microwave signals from said input means, an input device for rewriting information stored in the erasable memory media with the information received by said receiver;
each of said read out means comprising an antenna and a signal receiver for receiving said microwave signals from the recording means;
said input means comprising an antenna and a signal transmitter for sending microwave signals to the recording means.

5. An operation control system for automated guided vehicles according to claim 1, which further comprises;
stop means for stopping automated guided vehicles upon arrival thereof at the entrance to at least one predetermined area of the travel path loops;
dispatch means for restarting said automated guided vehicles stopped by said stop means;
dispatch control means for controlling said dispatch means to dispatch the automated guided vehicles in such a manner that the respective automated guided vehicles travel in said predetermined area while maintaining a predetermined distance from the preceding automated guided vehicles.

6. An operation control system for automated guided vehicles according to claim 5,
wherein said dispatch control means includes a time counting means for counting time and a means for operating said dispatch means at predetermined time intervals to dispatch the automated guided vehicles.

7. An operation control system for automated guided vehicles according to claim 6,
wherein said dispatch means comprises a light signal emitting device for emitting a light signal to the automated guided vehicle and a photo sensor installed on each automated guided vehicle for receiving said emitted light signal.

8. An operation control system for automated guided vehicles according to claim 6,
wherein said stop means for stopping the automated guided vehicles comprises a position indicating mark disposed on the travel path at an entrance of said predetermined area and a proximity sensor for sensing said position indicating mark installed on each automated guided vehicle.

9. An operation control system for automated guided vehicles according to claim 5,
wherein said dispatch control means includes an automated guided vehicle detector arranged along the travel path in said area and at a predetermined distance from the entrance thereof for detecting the passing by thereof of the automated guided vehicles, and means for operating said dispatch means to dispatch an automated guided vehicle when another automated guided vehicle is detected by said detector.

10. An operation control system for automated guided vehicles according to claim 9,
wherein said automated guided vehicle detector comprises a magnetic reed switch detector disposed on the travel path and a magnet installed on each automated guided vehicle.

11. An operation control system for automated guided vehicles according to claim 9, wherein said dispatch means comprises a light signal emitting device for emitting a light signal to the automated guided vehicle and a photo sensor installed on each automated guided vehicle for receiving said emitted light signal.

12. An operation control system for automated guided vehicles according to claim 9, wherein said stop means for stopping the automated guided vehicles comprises a position indicating mark disposed on the travel path at an entrance of said predetermined area and a proximity sensor for sensing said position indicating mark installed on each automated guided vehicle.

13. An operational control system for automated guided vehicles according to claim 1, which further comprises:
power switch control means for generating a switch ON signal and a switch OFF signal;
signal transmission means for transmitting said switch ON signal and said switch OFF signal to the automated guided vehicles;
signal receiving means installed in each automated guided vehicle for receiving signals from said signal transmission means;
switching means installed in each automated guided vehicle for switching OFF a power supplied to a travel control devices of each of said automated guided vehicles when said switch OFF signal is received by said signal receiving means; said switching means also switching ON the power supplied to said travel control devices when a switch ON signal is received by said signal receiving means.

14. An operation control system for automated guided vehicles according to claim 13,
wherein said signal transmission means comprises a transmitter for transmitting signals in the form of low frequency alternating current through guide wires laid along said travel paths, said signal receiving means comprising a pickup coil installed on each of said automated guided vehicle, said pickup coil being sensitive to said low frequency alternating current transmitted through said guide wires.

* * * * *